United States Patent [19]

Newkirk

[11] 4,444,079
[45] Apr. 24, 1984

[54] PROFILE CONTROL FOR SHEAR MECHANISM

[75] Inventor: Mark C. Newkirk, Vineland, N.J.

[73] Assignee: Maul Technology Corporation, Millville, N.J.

[21] Appl. No.: 388,052

[22] Filed: Jun. 14, 1982

[51] Int. Cl.³ .............................................. C03B 5/38
[52] U.S. Cl. ....................................... 83/600; 83/602
[58] Field of Search ................................. 83/600, 602

[56] References Cited

U.S. PATENT DOCUMENTS

| | | | |
|---|---|---|---|
| 2,472,560 | 6/1949 | Avery | 83/600 |
| 2,680,937 | 6/1954 | Peiler | 49/14 |
| 2,977,718 | 4/1961 | Dahlman | 83/600 |
| 3,333,937 | 8/1967 | Tatsak | 83/600 X |
| 3,736,826 | 6/1973 | Ward | 83/600 |
| 4,230,010 | 10/1980 | Guenthner | 83/600 |

Primary Examiner—Donald R. Schran
Attorney, Agent, or Firm—Seidel, Gonda & Goldhammer

[57] ABSTRACT

A profile control for a shear mechanism of a glass processing machine eliminates cams, gears, etc. otherwise required to oscillate the shear mechanism arms in unison in opposite directions between open and closed positions. The profile is the angular position time curve of the arms as they open and close over a predetermined angular displacement. The profile is controlled by adjustable oscillators and programmable memory (PROM) which determine the commands to a reversible dc motor drive. The control synchronizes the movement of the arms in proper phase relationship with respect to the feeder mechanism of the glass processing machine.

21 Claims, 2 Drawing Figures

PROFILE CONTROL FOR SHEAR MECHANISM

BACKGROUND

A shear mechanism having a pair of blades which cooperate to shear a continuous stream of molten glass into gobs is known. For example, see U.S. Pat. No. 2,680,937. Prior art devices, such as the mechanism disclosed in the patent, comprise cams, rods, levers, etc. which control the speed and angular displacement of the shear mechanism arms. These devices provide poor performance due to vibrations, space limitations, etc. Such devices have limited flexibility since it is necessary to stop the machine and change the cams to change the profile or angular position-time curve of the arms. Due to the construction of the prior art shear mechanism, it was not possible to synchronize the feeder and shear mechanisms in different phase relationships without seriously interrupting machine operation.

A shear mechanism which solves the above problems is disclosed in co-pending U.S. patent application Ser. No. 388,051, filed on even date, assigned to the assignee herein. The shear mechanism includes a housing adapted to be attached to the feeder bowl. First and second shafts are provided in the housing. A discrete arm is connected to each shaft. At least one discrete blade is connected to each arm. The blades are brought into overlapping relation to cut the glass stream. A reversible electric motor is supported by the housing. The motor has its output shaft mechanically connected to the first and second shafts for oscillating the arms in unison in opposite directions between open and closed positions.

SUMMARY OF THE INVENTION

The profile control of the present invention controls the speed and angular displacement of the arms of the shear mechanism disclosed in co-pending U.S. patent application Ser. No. 388,051. The profile control includes a presettable offset counter which electronically selects the phase relationship between the shear and feeder mechanisms and operates the mechanisms in synchronism. The speed of the arms when opening and closing is determined respectively by the frequency of pulses produced by forward and reverse oscillators and by data stored in programmable read only memory (PROM). The oscillator pulse train frequency and PROM data determine the spacing between successive command pulses which drive a reversible dc servomotor. Uniform displacement of the motor shaft for each command pulse is obtained by means of a position feedback loop. The spacing between successive command pulses therefore fixes the profile of the shear mechanism arms.

It is an object of the present invention to provide a profile control for a shear mechanism which eliminates the cams, rods, levers, etc. of the prior art.

It is another object of the present invention to provide a profile control for a shear mechanism wherein the phase relationship between the shear and feeder mechanisms may be adjusted on the fly.

It is another object of the present invention to provide a profile control for a shear mechanism wherein the profile of the blades may be varied of the fly.

Other objects and advantages of the present invention are set forth hereinafter.

For the purpose of illustrating the invention, there is provided in the drawings a form which is presently preferred; it being understood, however, that this invention is not limited to the precise arrangements and instrumentalities shown.

DETAILED DESCRIPTION

Figure 1:
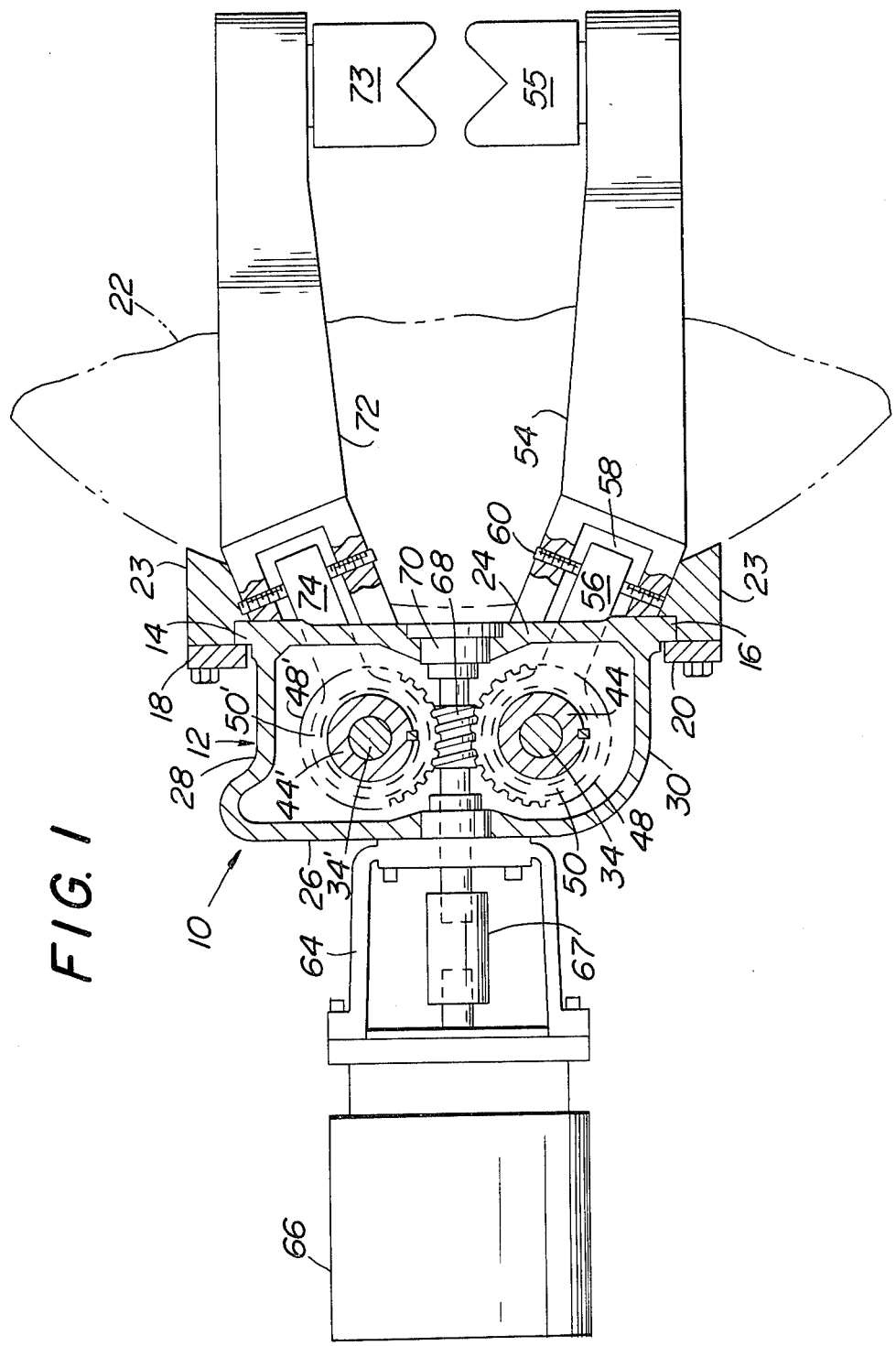
FIG. 1 is a horizontal sectional view of the shear mechanism disclosed in co-pending U.S. patent application Ser. No. 388,051.

Referring to the drawings in detail, wherein like numerals indicate like elements, there is shown in FIG. 1 a shear mechanism 10 described in co-pending U.S. patent application Ser. No. 388,051, incorporated herein by reference.

The device 10 includes a housing 12 having vertically extending flanges 14 and 16 on opposite sides thereof. The flanges 14 and 16 are adapted to contact a mating surface on the shear mechanism slide assembly 23. The slide assembly 23 is connected to the feeder bowl 22. A gib 18 is bolted to the feeder bowl slide assembly 23 and overlies flange 14. Similarly, a gib 20 overlies flange 16. Flanges 14 and 16 enable the device to be bolted to a feeder bowl slide assembly in the same manner as a prior art device whereby the shear mechanism may be substituted for the prior art device.

The housing 12 includes a rear wall 24, front wall 26, side walls 28 and 30, and a bottom. The height of side walls 28 and 30 is less than the height of rear wall 24.

A pair of vertically disposed shafts 34 and 34' are supported by the housing 12 and extend below the bottom wall. Each of the shafts 34, 34' is identical except as noted hereafter. Hence, only shaft 34 is described in detail with corresponding primed numerals being provided on the structure associated with shaft 34'.

A splined shaft 44 is keyed to the shaft 34. A gear wheel 48 projects radially outwardly from a hub keyed to the shaft 44.

The shaft 34 is attached to a hub 50 and retained in assembled relationship with an arm 54 by a nut. The arm 54 has a slot 58 into which extends a tongue 56 from the hub 50. Set screws 60 are threaded to the arm 54 and engage opposite side faces of tongue 56. A bolt (not shown) secures tongue 56 to arm 54. The set screws 60 and the tongue 56 may be adjusted to a limited range to adjust the angular relationship of arm 54 with respect to shaft 34. One or more blades 55 is attached to the arm 54 in a conventional manner.

A motor mounting bracket 64 is bolted to the front wall 26 of the housing 12. Bracket 64 supports a reversible electric motor 66. Motor 66 may be a dc servo motor capable of being rotated in opposite directions. The output shaft of motor 66 is connected to a worm 68 via a coupling 67. Worm 68 is meshed with the gear wheels 48, 48' and is thereby mechanically coupled to shafts 34, 34'.

The shaft 34' is coupled to arm 72 in a similar manner to that described above. The hub 50' has a tongue 74 which is adjustably coupled within a slot in the arm 72 as described above. Bolt 75 extends through a slot in arm 72 and is threaded to tongue 74. Arm 72 is provided with one or more blades 73. Blades 73 are below the elevation of blades 55. The blades 55 and 73 overlap in a closed position when cutting a stream of molten glass into gobs.

Since the mechanism 10 includes its own drive motor 66, the entire mechanism may be selectively positioned around the periphery of the feeder bowl 22.

Profile Control

Figure 2:
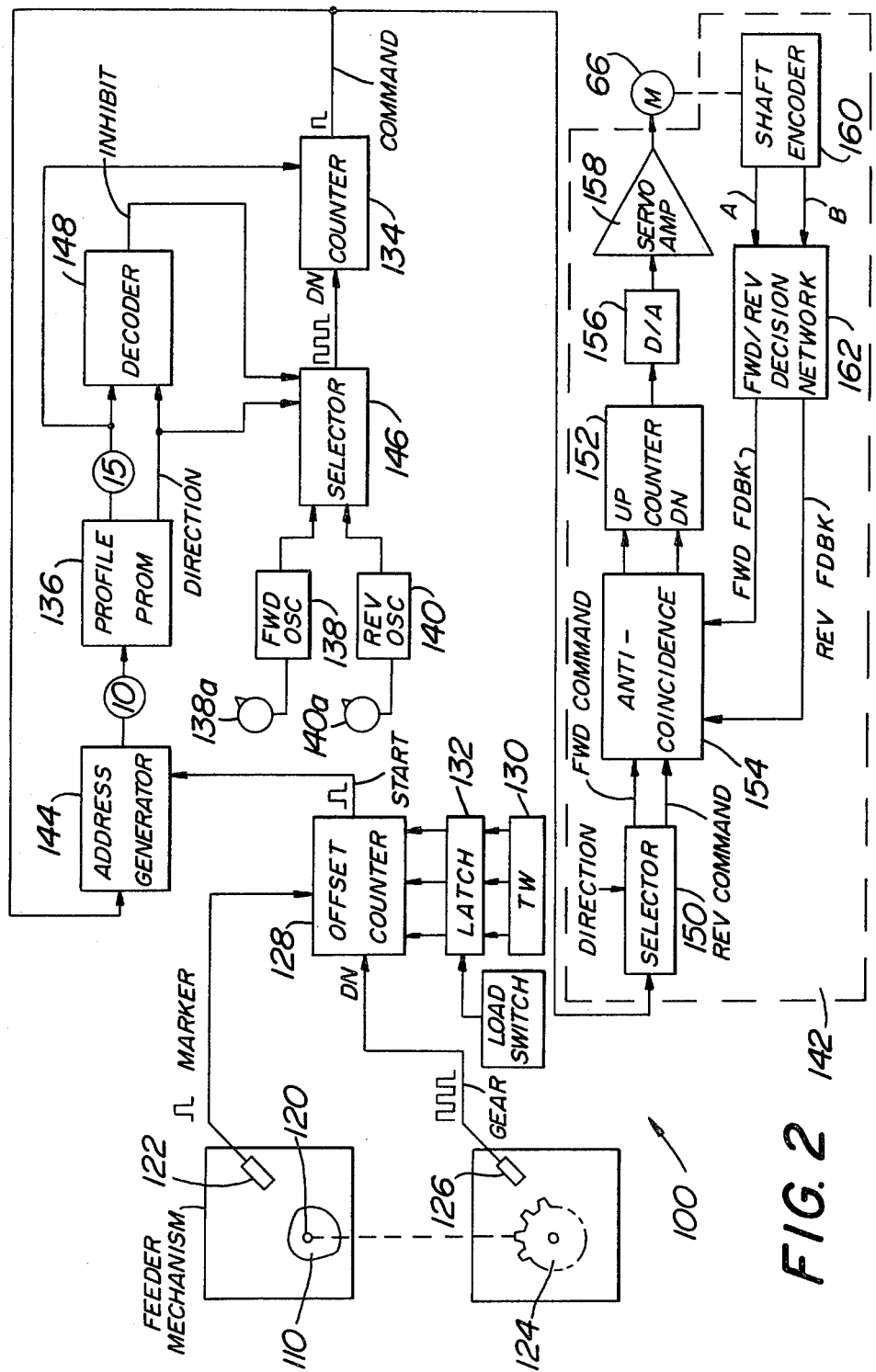
FIG. 2 is a block diagram of the profile control of the present invention.

The profile control of the present invention is shown in block diagram form in FIG. 2, designated generally as 100. The profile control provides a greater range of operating speeds of the shear mechanism as compared to the prior art because the speed of the mechanism can be adjusted on the fly. The control also makes possible on the fly adjustment of the phase relationship of the shear blades 55, 73 with respect to the feeder mechanism which controls the discharge rate of the glass stream. Thus, timing of the shear blades 55, 73 can be based on a sensing of position of the feeder mechanism cam to be certain that the feeder mechanism and the shear mechanism are synchronized, at any phase relationship as described hereafter.

Prior art devices had a means for mechanically adjusting the angular opening of the arms 54, 72. That was accomplished by putting in a new cam and new links after stopping the operation. The profile control 100 facilitates adjustment of the angular opening of the arms 54, 72 merely by utilizing more or less storage locations in a programmable read only memory (PROM).

The profile control 100 also facilitates operating the arms 54, 72 at different profiles during opening and closing operations. That is, the arms 54, 72 can be caused to follow one profile while opening and another profile when closing. The profiles can be tailored separately to shorten the shear mechanism operating cycle which means greater productivity.

Additionally, it is possible to provide for greater blade dwell in the open position between cuts of the glass stream. Greater dwell time facilitates improved cooling of the blades. If the blades are too hot, the molten glass sticks to them.

In addition to easy adjustment of the operating cycle and dwell times, the present invention insures uniform blade cutting speeds with deceleration of the blades as they cut the molten glass.

In other words, the invention facilitates tailoring the action of the shear blades 55, 73 to the job to be done. Prior art devices may operate at a maximum speed of 135 shear cuts per minute. The present invention can increase the maximum speed to 220 shear cuts per minute. This is significant when it is considered that the mechanism 10 may be substituted for a conventional mechanism on the feeder bowl using the identical mounting means on the feeder bowl.

Synchronization To Feeder Mechanism

The feeder mechanism of the glass processing machine includes a cam 110 mounted on a drive shaft 120. A proximity sensor 122 generates a marker pulse for each 360° rotation of the cam 110, representing one operating cycle of the feeder mechanism.

A gear 124 is mounted on the shaft 120. A proximity sensor 126 senses the teeth on gear 124, producing a pulse as each tooth passes the sensor. The output of sensor 126 is a series of gear pulses shown in FIG. 2. The number of teeth on gear 124 is chosen so as to result in 360 sensor pulses for each complete revolution of the cam 110, i.e. one pulse per degree of cam revolution.

Each complete revolution of the cam 110 results in a marker pulse which enables an offset counter 128 to count down the number of gear pulses generated by sensor 126. The offset counter 128 is provided to allow adjustment of the phase relationship between the shear mechansim 10 and the feeder mechanism. The offset counter 128 is configured as a three decade down counter.

The marker pulse loads the offset counter with a preset number set by operator adjustable thumbwheel switches 130 via a latch 132 controlled by a load pushbutton switch. The switch is depressed to load the thumbwheel setting into the latch 132. The offset counter is sequentially decremented from the preset number by the gear pulses generated by sensor 126. When the offset counter reaches 0, it generates a start pulse. The start pulse initiates operation of the shear mechanism 10.

The delay interval between the marker and start pulses is adjustable by means of the thumbwheel switches 130. The delay interval fixes the phase relationship between the feeder and shear mechanisms. Once the thumbwheel switches are set and the load pushbutton depressed, no further operator action is required to synchronize the feeder and shear mechanisms at the desired phase relationship.

Speed Profile And Angular Displacement Between Open And Closed Positions

The motor 66 is a reversible dc servomotor. The electronic commands for the motor 66 are generated by a down counter 134. The down counter 134 is preset to data in the form of a digital number stored at address locations of a programmable read-only memory (PROM) 136 and is decremented from the preset count by pulses generated by an adjustable forward oscillator 138 or an adjustable reverse oscillator 140. Oscillators 138, 140 are continuously running oscillators each of which produce a pulse train having an adjustable frequency. The frequency of each pulse train may be adjusted by an operator accessible potentiometer control 138a or 140a. When the counter 134 reaches 0, it generates a command pulse which drives the motor 66 as described hereafter, causing the motor shaft to rotate a uniform angular distance as fixed by a position control circuit 142.

At each address location of PROM 136, a digital number is stored representative of a preselected number of time units. Each digital number is used to preset the counter 134 as described above. Each time unit is equal to the spacing between successive forward oscillator pulses or the spacing between successive reverse oscillator pulses, depending on whether the forward or the reverse oscillator is decrementing the counter 134. Position control circuit 142 insures that each command pulse generated by the counter 134 results in a uniform angular displacement of the shaft of motor 66. The speed at which the motor shaft is driven in response to a command pulse is equal to the quotient of the angular displacement of the shaft and the digital number retrieved from the appropriate address location in PROM 136. The profile of the shear mechanism arms is therefore determined by the forward and reverse oscillator frequencies and the PROM contents. Any profile can be changed on the fly by altering oscillator frequency or with minimal interruption by altering the contents of the PROM.

If it is desired to alter the speed of arms 54, 22 on the fly, the frequencies of the forward or reverse oscillator pulse trains may be varied by the operator accessible potentiometer control 138a or 140a without changing the PROM contents. That is, for a particular profile the PROM data (number of time units required for a uniform angular displacement of the motor shaft between two particular angular positions) may remain unchanged but the value of each time unit may be varied by changing the frequency of the forward oscillator pulse train or the reverse oscillator pulse train.

On the other hand, if it is desired to alter the total angular displacement of the arms 54, 72 between open and closed positions, more or less PROM storage locations may be utilized either by re-programming the PROM or by substituting a new PROM.

In operation, the start pulse generated by the offset counter 128 resets an address generator 144. The address generator comprises three 4 bit binary counters connected in cascade and is incremented by each pulse generated by the down counter 134. The address generator outputs are connected to the address lines of the PROM 136. Thus, each command pulse generated by counter 134 causes the address generator 144 to address the next storage location of the PROM.

Each storage location of the PROM contains 16 bits. Fifteen of the bits are so-called "data" bits which represent a number used to preset the counter 134. The remaining bit is a so-called "direction" bit which controls a selector 146. The selector gates the forward oscillator pulses or the reverse oscillator pulses to the count down input DN of counter 134, depending on the value of the direction bit.

Initially, the arms 54, 72 are in the open position, separated by a predetermined angular distance. The address generator 144 is reset by the start pulse to the first PROM address location. The direction bit from the first PROM address location indicates travel in the "forward" direction (arms 54, 72 closing). The selector 146 gates the forward oscillator pulses to counter 134. The counter 134 generates the command pulses based on the forward oscillator pulses to cause the arms 54, 72 to close toward each other. That is, the shaft of motor 66 rotates in the so-called "forward" direction to close the arms 54, 72 in response to the command pulses. The command pulses increment the address generator 144. Data stored at successive PROM address locations is used to preset the counter 134. Each time the counter 134 counts to 0, it generates a command pulse thereby moving the motor shaft. The profile of the arms 54, 72 is therefore determined by the PROM contents and the frequency of the forward oscillator pulses.

At a preselected storage location of the PROM 136, the direction bit changes value to initiate reverse movement of the arms 54, 72 away from each other. The address at which the direction bit changes value corresponds to the number of command pulses or number of uniform angular displacements of the motor shaft which are expected to bring the arms 54, 72 to the closed position wherein the molten glass is cut into gobs by the blades 55, 73.

The selector 146 senses the change in value of the direction bit and routes the reverse oscillator pulses to the counter 134. The profile of the arms 54, 72 is now determined by the contents of PROM 136 and the frequency of the reverse oscillator pulses. The command pulses drive the motor 66 so as to turn the motor shaft in the so-called "reverse" direction to cause the arms 54, 72 to travel towards the open position.

The counter 134 continues to advance the address generator 144. When the counter generates the number of command pulses expected to bring the arms 54, 72 back to the open position, the count maintained by address generator 144 corresponds to the last address location utilized in the PROM. At this address location, the PROM contains a coded 16 bit word, such as all "1's", which indicates completion of a shear mechanism cycle. The coded word is decoded by decoder 148 which generates an inhibit pulse thereby preventing the selector 146 from routing any oscillator pulses to the counter 134. No further command pulses are generated by counter 134 until the address generator 144 is reset by the next start pulse, indicating the next cycle of operation of the shear mechanism.

Position Control

The command pulses drive the motor 66 via the position control circuit 142. This circuit assures that the motor shaft is displaced uniformly by each command pulse.

Each command pulse is routed by a selector 150 to and up/down counter 152 via an anti-coincidence gate 154. The command pulses are routed by selector 150 to the forward command (FWD COMMAND) input to the anti-coincidence gate 154 if the direction bit indicates forward travel of the motor shaft (closing of the arms 54, 72). The anti-coincidence gate transmits the pulses to the up terminal of counter 152. The contents of the counter are converted to an analogue signal by digital to analogue converter 156 which drives a servo-amplifier 158 of the pulse width modulated type such as that manufactured by Glen Tek company of Santa Monica, California.

Angular position of the motor shaft is sensed by an optical shaft encoder 160 having quadrature channel outputs A and B. The phasing (lead or lag) of the quadrature channel outputs indicates the direction of travel of the motor shaft (forward or reverse) as is well known. The shaft encoder 160 preferably generates 200 pulses per 360° of revolution of the motor shaft so that a pulse appears on the channel A and channel B lines every 1.8° of angular displacement of the motor shaft.

The direction of travel of the motor shaft is detected by a forward/reverse decision network 162 based on the phasing between the channel A and channel B pulses. If the motor shaft is being displaced in the forward direction in response to a command pulse, the forward/reverse decision network 162 transmits a pulse on the forward feedback (FWD FDBK) input to the anti-coincidence gate for each 1.8° of travel of the motor shaft. The anti-coincidence gate 154 routes the forward feedback pulse to the down input of counter 152. Thus, the counter is incremented by each forward command pulse and decremented by each forward feedback pulse. This insures that each command pulse will result in 1.8° of travel of the motor shaft over a time period determined by the PROM data and the forward oscillator frequency.

Similarly, if the direction bit indicates reverse travel (opening of arms 54, 72), selector 150 routes the command pulses to the reverse command (REV COMMAND) input of the anti-coincidence gate, and the reverse command pulses are transmitted by the anti-coincidence gate to the down input terminal of counter 152. This results in reverse movement of the motor shaft. The direction of shaft travel as represented by the phasing of the quadrature channel outputs A and B of shaft encoder 160 is detected by the forward/reverse decision network 162. The network 162 routes an encoder pulse to the reverse feedback (REV FDBK)

input to the anti-coincidence gate, and the gate transmits the pulse to the up terminal of counter 152. Accordingly, each reverse command pulse results in 1.8° of travel of the motor shaft. The time interval over which the 1.8° is traversed by the motor shaft is determined by the PROM data and the frequency of the reverse oscillator pulses.

The total angular displacement of the arms 54, 72 between open and closed positions can be varied by altering the number of pulses generated by the shaft encoder 160 per 360° revolution of the motor shaft. For example, the total angular displacement can be doubled if the shaft encoder 160 is made to generate 100 pulses per 360° of revolution of the motor shaft. Thus, each command pulse generated by counter 134 results in 3.6° of angular displacement of the motor shaft over each of the time periods set by PROM 136. Alternatively, additional data may be stored in unused address locations of the PROM 136 to increase the number of command pulses generated over an operating cycle of the shear mechanism to achieve a similar result.

Similarly, to reduce the total angular displacement of the arms, for example by by one half, the shaft encoder is made to generate 400 pulses per 360° of revolution. Thus, each command pulse results in a 0.9° of angular displacement of the motor shaft. Alternatively, less address locations of PROM 136 may be utilized to decrease the number of command pulses generated over the operating cycle to achieve a similar result.

Regardless of the total angular displacement of the arms 54, 72 during an operating cycle of the shear mechanism, the profile of the arms may be varied on the fly by operator adjustment of the oscillator potentiometers 138a, 140a as already explained. Separate adjustment of the forward oscillator pulse train frequency and reverse oscillator pulse train frequency enable the arms 54, 72 to be closed and opened at different speeds.

The spacing between the command pulses can be increased to decelerate the arms 54, 72 as they close to cut the glass stream merely by storing numbers of higher value at the appropriate address locations in the PROM.

The arms 54, 72 may be made to dwell in the open position to allow the blades 55, 73 to cool simply by loading the last used PROM address with all "1's" as already explained. This prevents any command pulses from being generated until the address generator 144 is reset by the next start pulse at the beginning of the next operating cycle of the shear mechanism.

The present invention may be embodied in other specific forms without departing from the spirit or essential attributes thereof and, accordingly, reference should be made to the appended claims, rather than to the foregoing specification, as indicating the scope of the invention.

I claim:

1. Profile control for a shear mechanism having blades driven between open and closed positions by an oscillating shaft of a motor in synchronism with the feeder mechanism of a glass processing machine, comprising:

means for generating motor command pulses spaced proportional to the desired speeds of the blades;
   means for causing the motor to move the shaft in response to each command pulse at a speed proportional to the spacing between successive command pulses;
   means responsive to said motor command pulses for generating a direction signal representative of a reversal in the desired direction of travel of the motor shaft; and
   means for causing the motor to reverse the direction of travel of the shaft in response to the direction signal.

2. Profile control according to claim 1 including means for sensing when the feeder mechanism reaches a preselected point of its operating cycle, and means operatively associated therewith for disabling said means for generating said motor command pulses until said feeder mechanism reaches said preselected point of its operating cycle and for enabling said means for generating said motor command pulses thereafter whereby the shear mechanism and the feeder mechanism are operated in synchronism in a preselected phase relationship.

3. Profile control according to claim 1 including operator accessible means for adjusting the spacing between said command pulses.

4. Profile control according to claim 1 including means for causing said motor to move said shaft a uniform angular distance in response to each of said command pulses.

5. Profile control according to claim 1 including means for detecting a preselected number of said motor command pulses corresponding to return of the blades to the open position and for inhibiting said means for generating said motor command pulses temporarily whereby said blades are caused to dwell in said open position.

6. Profile control according to claim 1 wherein said means for generating said motor command pulses includes means for generating said motor command pulses at a first frequency if said direction signal indicates a desired direction of travel in a forward direction, and means for generating said motor command pulses at a second frequency if said direction signal indicates desired direction of travel in a reverse direction.

7. Profile control according to claim 4 wherein said means for causing said motor to move said blades a uniform angular distance in response to each command pulse includes means for generating feedback pulses representative of motor shaft displacement, and means for causing the motor to move the shaft a uniform angular distance in response to each command pulse and each feedback pulse.

8. Profile control for a shear mechanism having blades driven between open and closed positions by an oscillating shaft of a motor in synchronism with the feeder mechanism of a glass processing machine, comprising:

means for generating first and second sets of motor command pulses;
   means for causing the motor to move the shaft in a forward direction at speeds proportional to the spacing between successive command pulses of the first set and in a reverse direction at speeds proportional to the spacing between successive command pulses of the second set;
   whereby the blades are moved in a forward direction from the open position to the closed position at speeds proportional to the spacings between command pulses of the first set and in a reverse direction from the closed position back to the open position at speeds proportional to the spacings between command pulses of the second set.

9. Profile control according to claim 8, including means for sensing when the feeder mechanism reaches a preselected point of its operating cycle, and means for disabling said means for generating said first and second sets of motor command pulses until the feeder mechanism reaches said predetermined point of its operating cycle and for enabling said means for generating said first and second sets of motor command pulses thereafter whereby said shear mechanism and said feeder mechanism are operated in synchronism in a preselected phase relationship.

10. Profile control according to claim 8 including operator accessible means for independently adjusting the spacings between motor command pulses of the first set and the spacings between motor command pulses of the second set.

11. Profile control according to claim 8 wherein said means for causing said motor to move said shaft includes means for causing said motor to move said shaft a uniform angular distance in response to each command pulse.

12. Profile control according to claim 8 including means for detecting a preselected number of said motor command pulses corresponding to return of the blades to the open position and for disabling said means for generating said first and second sets of motor command pulses temporarily whereby said blades are caused to dwell in said open position.

13. Profile control for a shear mechanism having blades driven between open and closed positions by an oscillating shaft of a motor in synchronism with the feeder mechanism of a glass processing machine, comprising:
memory means for storing at successive locations data representative of the number of time units desired for the motor to move the shaft a uniform angular distance in response to a command pulse;
means for generating pulses each of which represents a time unit;
means for generating motor command pulses having a spacing determined by said stored data and the frequency of said time unit pulses; and
means for causing the motor to move the shaft in response to each command pulse at a speed proportional to the spacing between successive command pulses.

14. Profile control according to claim 13 including operator accessible means for adjusting the frequency of said time unit pulses.

15. Profile control according to claim 13 including means for sensing when the feeder mechanism reaches a preselected point of its operating cycle, and means operatively associated therewith for disabling said means for generating said motor command pulses until the feeder mechanism reaches said preselected point of its operating cycle whereby the shear mechanism and feeder mechanism are operated in synchronism in a preselected phase relationship.

16. Profile control according to claim 13 including means for causing said motor to move the shaft a uniform angular distance in response to each command pulse.

17. Profile control according to claim 13 wherein said means for generating said time unit pulses includes means for generating said time unit pulses at a first adjustable frequency to move the motor shaft in a forward direction and at a second adjustable frequency to move the motor shaft in a reverse direction.

18. Profile control according to claim 13 wherein said memory means includes a preselected storage location containing coded data, including means for detecting a preselected number of said motor command pulses corresponding to return of the blades to the open position and for retrieving said coded data, and means for temporarily disabling said means for generating said motor command pulses in response to said retrived coded data, whereby said blades are caused to dwell in the open position.

19. Profile control according to claim 13 wherein said memory means is a PROM, and wherein said means for generating said motor command pulses includes a presettable counter for counting said time unit pulses and for generating a command pulse when the count reaches a number to which the counter is preset, means for presetting the counter to a number indicated by the data contained in a PROM storage location, and means for addressing successive PROM storage locations in response to said command pulses.

20. Profile control according to claim 13 wherein said means for causing said motor to move said shaft includes means for generating feedback pulses representative of motor shaft displacement, and means for causing the motor to move the shaft a uniform angular distance in response to each command pulse and each feedback pulse.

21. Profile control according to claim 20 wherein said means for causing said motor to move said shaft a uniform angular distance includes an up/down counter for counting said command and feedback pulses in opposite directions.

* * * * *